May 24, 1960   J. LION   2,937,879
CONTAINER FOR THE TRANSPORTATION OF VARIOUS GOODS
Filed June 3, 1957   4 Sheets-Sheet 1

May 24, 1960 J. LION 2,937,879
CONTAINER FOR THE TRANSPORTATION OF VARIOUS GOODS
Filed June 3, 1957 4 Sheets-Sheet 2
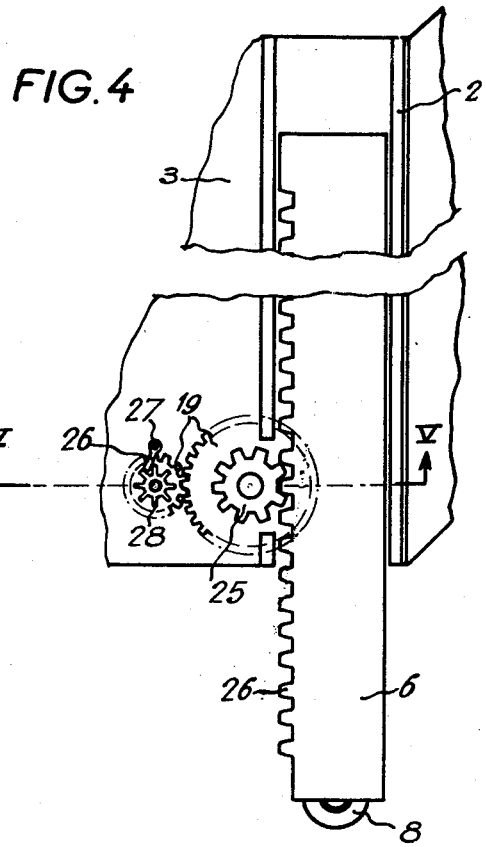
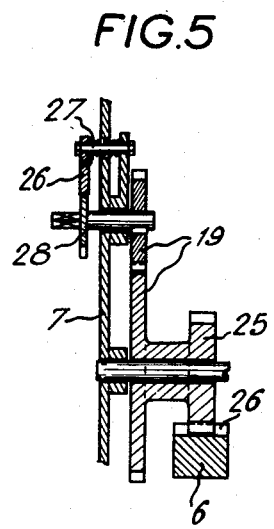
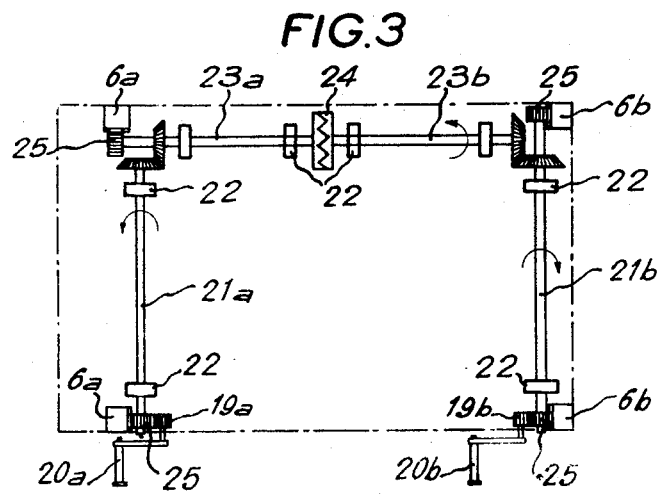

May 24, 1960  J. LION  2,937,879
CONTAINER FOR THE TRANSPORTATION OF VARIOUS GOODS
Filed June 3, 1957  4 Sheets-Sheet 4

United States Patent Office 2,937,879
Patented May 24, 1960

2,937,879

CONTAINER FOR THE TRANSPORTATION OF VARIOUS GOODS

Jean Lion, 18 et 20 rue Mathis, Paris 19, France

Filed June 3, 1957, Ser. No. 663,197

Claims priority, application France July 19, 1956

1 Claim. (Cl. 280—43.21)

This invention relates to containers suitable for transporting goods of any desired character. More specifically the invention relates to improved containers embodying improved handling means as built-in parts thereof.

The use of large-sized, generally box-shaped containers is becoming ever more widespread in the shipment of various merchandise. An important advantage of such a container is that it can be transported and handled as a single unitary load, of convenient configuration, whereas the handling of individually packed articles would necessitate a greater number and greater complication of the handling operations. The containers heretofore used, however, all involve the use of separate, auxiliary handling and/or lifting equipment at each of the locations where the container has to be handled, as for loading and unloading into and from a vehicle or craft, and for delivering it at its place of destination. It is a general object of this invention to do away with this requirement.

It is, therefore, an object of the invention to provide an improved container which does not require the use of separate handling and/or lifting equipment. A correlated object is the provision of a container incorporating built-in hoisting and/or handling means as an integral part of it. With the attainment of these objects, the invention will make it possible to deliver the container to its point of destination without requiring the provision of any or substantially separate handling equipment at either the terminal or intermediate points of shipment, even though a number of different shipping conveyances, such as railway, aircraft, and/or motor vehicles, may be involved.

A container according to the invention essentially comprises a box-shaped case and lifting means associated therewith for cooperation with a surface on which the container is supported, whereby any desired reasonable position may be imparted to the container both in respect to its vertical spacing and its angular orientation with respect to said surface. The lifting means may be provided in the form of telescopic jacks actuated mechanically, hydraulically or pneumatically. The actuating means for said jacks, which may comprise mechanical shafting and gearing, or fluid lines pump and valving as the case may be, are preferably housed within the depth of the side and/or bottom walls of the box-like container.

Further according to the invention, the container may comprise removable or retractible rolling means, such as wheels, rollers or preferably castors, whereby the container may be easily moved upon its supporting surface. Advantageously the rolling means are in the form of removable pivoted castors selectively securable to the lower ends of the hoisting jacks mentioned above, or directly to the container bottom for use when the jacks are retracted.

Depending on the particular shipping conveyance in connection with which the container may primarily have to be used, e.g. barge or freighter ship, goods train or motor truck or lorry, aircraft, etc., and depending also the particular character of the goods to be predominantly transported therein, certain specific features may, according to the invention, be embodied in the improved container. It is emphasized however that the invention essentially contemplates the provision of containers that may be used indiscriminately in connection with various different shipping conveyances and various different types of goods conveyed.

For most types of goods it will be preferable to use a sealed container. For other kinds of merchandise however the container may be provided open at the top, for readier loading, and may be simply covered during transport with a tarpaulin cover or the like. This may be found advantageous both in respect to individual units such as complete machine assemblies, and materials in bulk such as coal, ore, building materials and the like. In other cases sliding doors may be provided in a side of the container adjacent the bottom of it, for cooperating with a chute or inclined plane in unloading the contents.

A container according to the invention may take the form of a tank for use with liquid materials.

Thermostatic regulating means may be associated with the container where the contents thereof is to be maintained at a particular temperature during transportation.

In connection with air transport, the containers would desirably be shaped for interfitting and/or locking engagement with complementary means defined in the aircraft fuselage so as to use the available space therein to maximum advantage.

In all cases, suitable guide means may be provided for facilitating loading and unloading operations of the container into and from the shipping conveyance, part of the guide means being desirably associated permanently or removably with the container, and part with the conveyance.

Any suitable anchoring or fastening means may be used for making the containers fast in the craft or vehicle, such as conventional cable or chain tackle, cooperating with suitable hooking or engaging means provided on the container.

A few exemplary embodiments of the invention will now be described by way of illustration but not of limitation with reference to the accompanying drawings, wherein:

Fig. 3 is a diagrammatic showing of mechanism for actuating the hoist means of the container;

Fig. 4 is a large-scale fragmentary view of part of the mechanism;

Fig. 5 is a section on line V—V of Fig. 4;

Figure 1:
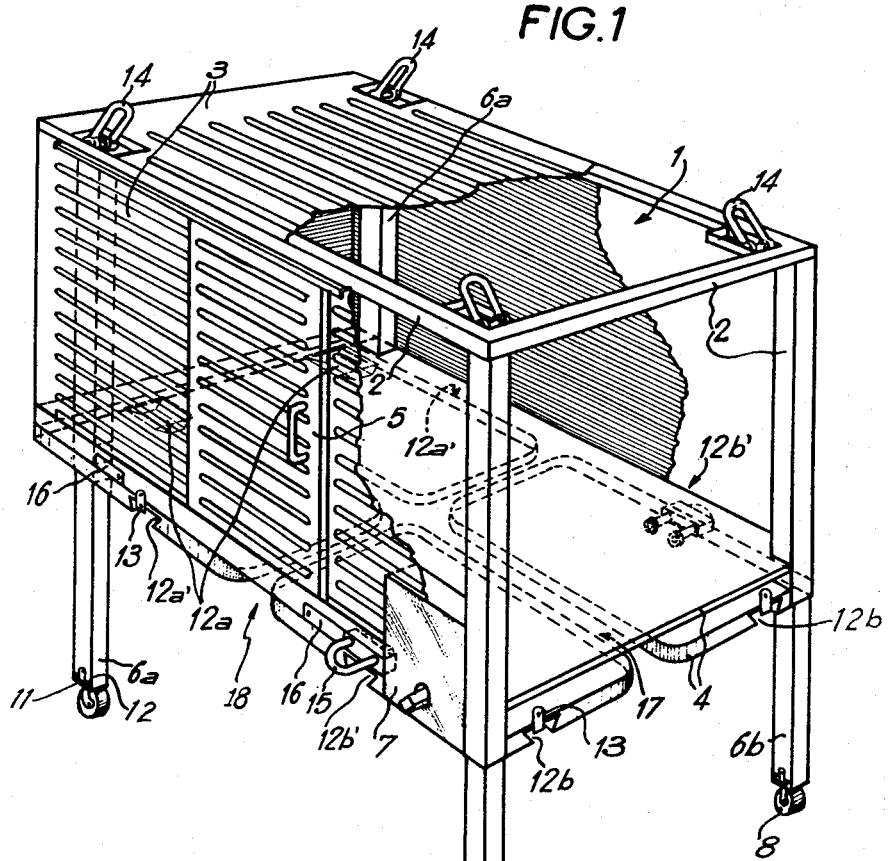
Fig. 1 is a perspective view of a container assembly according to the invention, with parts broken away.

As shown generally in Fig. 1, an improved container comprises a parallelepipedic (box-shaped) casing or box 1, sealed on all sides, made from a framework 2 comprising sectional metallic elements over which sheeting elements 3 preferably made from a lightweight alloy, are secured. The bottom of the container is defined by a double spaced panel 4. Horizontally slidable doors, such as the one shown at 5, are provided in the construction shown.

The hoist means comprise four telescopic jack legs 6 housed within the upright sectional elements of the container to be guided for sliding movement therein. Thus, the box 1 has housings in its walls extending vertically for the height thereof. (See Fig. 1.) The jacks are arranged in the following way. Two jacks, designated 6a, are arranged somewhat rearward of the front side of the container, being shown on the left side of the container in Fig. 1, and two jacks 6b are disposed at the rear edges of the container. The actuating mechanism for the jack legs is housed partly in a housing 7 and partly within the space between the spaced elements of the double bottom 4. The four jack legs are illustrated in their expanded condition.

Figure 2:
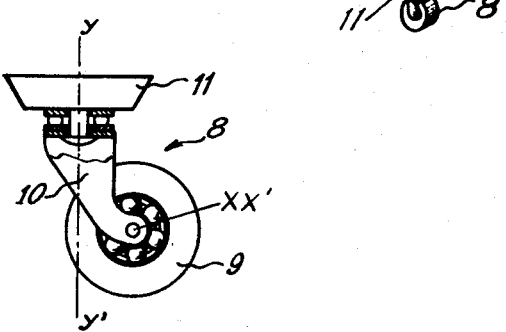
Fig. 2 illustrates in detail a caster assembly.

Castors 8 are securable to the lower ends of the jack legs, and one is shown in greater detail in Fig. 2. The castor assembly comprises a roller 9 journalled on a ball bearing about a pivot $x, x'$ and supported by spaced arms 10 which in turn are journalled by way of a ball thrust bearing about a vertical pivot $y, y'$ on a base flange 11 securable by any suitable means to the lower end of the related leg 6a or 6b. The pivot axis $y, y'$ is horizontally spaced a sufficient distance from horizontal pivot axis $x, x'$ to ensure a satisfactory self-orienting of the castor when the container is pushed about, as is well known in the construction of such devices. The base flange 11 is shown as a bevel-sided plate adapted to be fitted either into suitable dovetail slots 12 formed at the lower ends of the jack legs, or, into similar dovetail slots 12b or 12b' in the container bottom, depending on requirements when mounted, the castors are retained in position by latches 13. There are eight dovetail slots provided around the periphery of the container bottom, being distributed as follows: two slots 12a are provided on the smaller front side, two slots 12a' at the front of each long side, two slots 12b on the rear short side and two slots 12b' at the rear of each long side. For convenience in illustration, only some of the slots have been shown, while the location of others has simply been indicated by arrows.

Pivoted to the top of the container at the corners of it are four rings 14 serving to lash the container and/or to cooperate with the tackle of a crane or similar lifting apparatus when required as for transshipment purposes. Similarly, inwardly retractible rings 15 are shown at the bottom of the casing for lashing the container fast as in the hold of a ship. Sliding cover strips 16 are provided for retaining the lower rings 15 in retracted position.

Extending along the bottom of the container are a pair of crossed grooves or channels 17 and 18, adapted to cooperate with a guide rail secured on a loading or unloading platform to fix the direction of movement of the container thereon.

The container thus described is adapted to be handled and operated as an autonomous, self-contained unit during loading, unloading and transshipping operations. While the manner in which such operations will be performed will differ depending on the particular circumstances operations are in all cases simplified and facilitated owing to the self-contained lifting and rolling means provided according to the invention.

Thus for example, assuming the case where the container is being conveyed by means of a motor vehicle having a width of carrier platform and a wheel spacing narrower than the width of the container, the unloading maneuver may conveniently be as follows. Referring to Fig. 1, assuming that the container there shown is resting across the platform of the vehicle, with the ends of the carrier projecting beyond the sides of the platform, the jack legs 6 may be expanded until the castor ends thereof are resting on the ground, and the vehicle may then be driven away to leave the container at its selected point of destination. A loading operation would follow a reverse procedure. The above operations may be facilitated by the provision of a guideway on the truck adapted to cooperate with the guide channel 17 or 18 at the bottom of the container.

In cases where the vehicle platform is at least equal in width to that of the container, a different maneuver would be used. To unload the container, assuming the cab of the truck or lorry is positioned adjacent to the front legs 6a, the front legs 6a and rear legs 6b would be lowered so as to raise the container slightly off the platform. The castors are positioned respectively in the side rear slots 12b' and the front slots 12a, and the jack legs are then retracted. The container can now be displaced towards the rear of the vehicle so as to disengage the rear legs 6b from the platform, whereupon the castors 8 are fitted and the legs are lowered down to the ground. The castors 8 on the rear legs 6b are now resting on the ground and if necessary blocked with suitable shims, and the vehicle is driven forward, thereby easily disengaging the container due to the castors in recesses 12a riding over the platform, until the front legs 6a have completely cleared the platform of the truck. The front of the container, however, extends beyond these legs, as already explained and as illustrated at the left part of Fig. 1, and may be supported by the truck. The front legs 6a are then also fitted with castors 8 and lowered until they rest on the ground. The container is now resting horizontally upon its expanded jack legs, and the vehicle is driven away clear of the container. The container may thus be unloaded upon a raised platform by backing the vehicle to a position adjacent the latter, in which case a removable safety leg is preferably placed to compensate for any unbalance of the container that may result from the slightly off-center relationship of the jacks. Where on the other hand the container is being unloaded on a level with the ground, the four legs would be retracted. Loading operations would be effected by following a reverse procedure in each instance.

The container may be readily displaced on the ground either by using its own rolling castor means, or it may be loaded on a lowswung truck of conventional type.

As a further example of the manner in which the invention may be used, the transfer of a container from a motor-vehicle to a railroad car will be described. The truck is placed parallel to the car, and runways are positioned front and rear of the container to provide a connection between the truck and car. The legs are operated to permit positioning the castors, then the container is secured by its ends to the tackle of a winch positioned on the car, and is easily transferred from the truck to the car by operating the winch. The castors are then removed and the container is thus brought to rest with its bottom on the car and is lasted fast in a conventional manner. For a reverse transfer operation from the railroad car to a truck, the winch would be placed on the truck and the operation would proceed similarly to that described above.

Fig. 3 diagrammatically illustrates in plan a simple form of operating mechanism for the leg jacks 6. A reducer gearing 19 operated by way of handle or crank 20a or 20b rotates a shaft 21a or 21b journalled in bearings 22. Bevel gears transmit rotation to shafts 23a and 23b. A coupling 24, e.g. of the dog clutch type, is inserted between the shafts 23a and 23b. The respective shafts mentioned have spur gears 25 secured on them which mesh with racks 26 integral with the jacks 6. Such a system makes it possible to use a single crank handle for operating all four jacks when the clutch 24 is engaged; with the clutch disengaged the front and rear jacks 6a and 6b may be operated independently by means of the cranks 20a and 20b.

Figs. 4 and 5 illustrate in some detail the reducer gearing 19. Means are provided for latching the jacks in either position. For this purpose a pawl 26 cooperates with the teeth of a sprocket gear 28. The pawl is pivoted and pressed by a spring 27 so that in its idle position the pawl extends through the axis of the sprocket 28 which is integral with reducer gear 19. In the position shown in Fig. 4, the jack 4 is latched in the expanded condition. To reverse the latching condition, the pawl 26 need simply be pushed back and then reengaged with the opposite sides of the teeth of sprocket 28.

Figure 6:
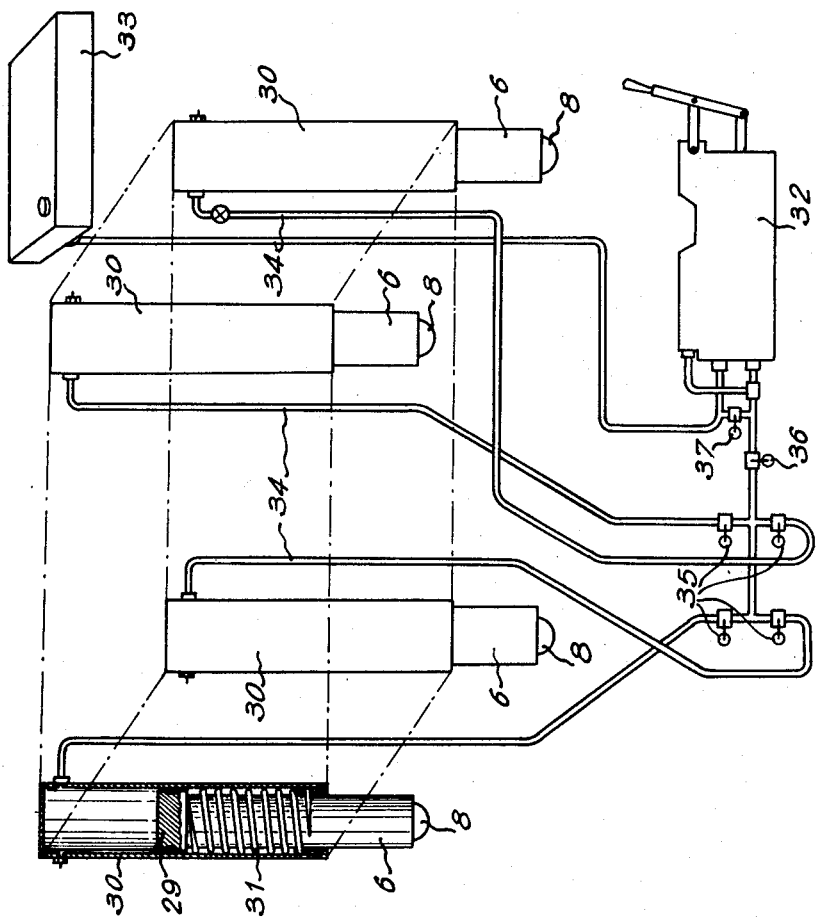
Fig. 6 is a simplified showing of hydraulic system for operating the hoist means of a container such as that shown in Fig. 1.

In Fig. 6, there is diagrammatically illustrated as an alternative a hydraulic construction of the system for operating jacks 8. In this example, the legs 6 form piston rods attached to pistons 29 movable in cylinders 30 housed within the container. Springs 31 or equivalent biasing means urge the legs to the retracted condition as shown in section at the top left corner of Fig. 6. The hydraulic fluid that operates the pistons 29 is discharged by a manually-operated pump 32 from an overhead tank 33 over a plurality of flow lines 34. The lines are provided by conduits housed within the sides and double-panelled bottom of the container. Valves 35 are provided for selectively operating any one of the respective leg jacks. A safety cut-off valve 36 and a relief valve 37 are further provided.

Figure 7:
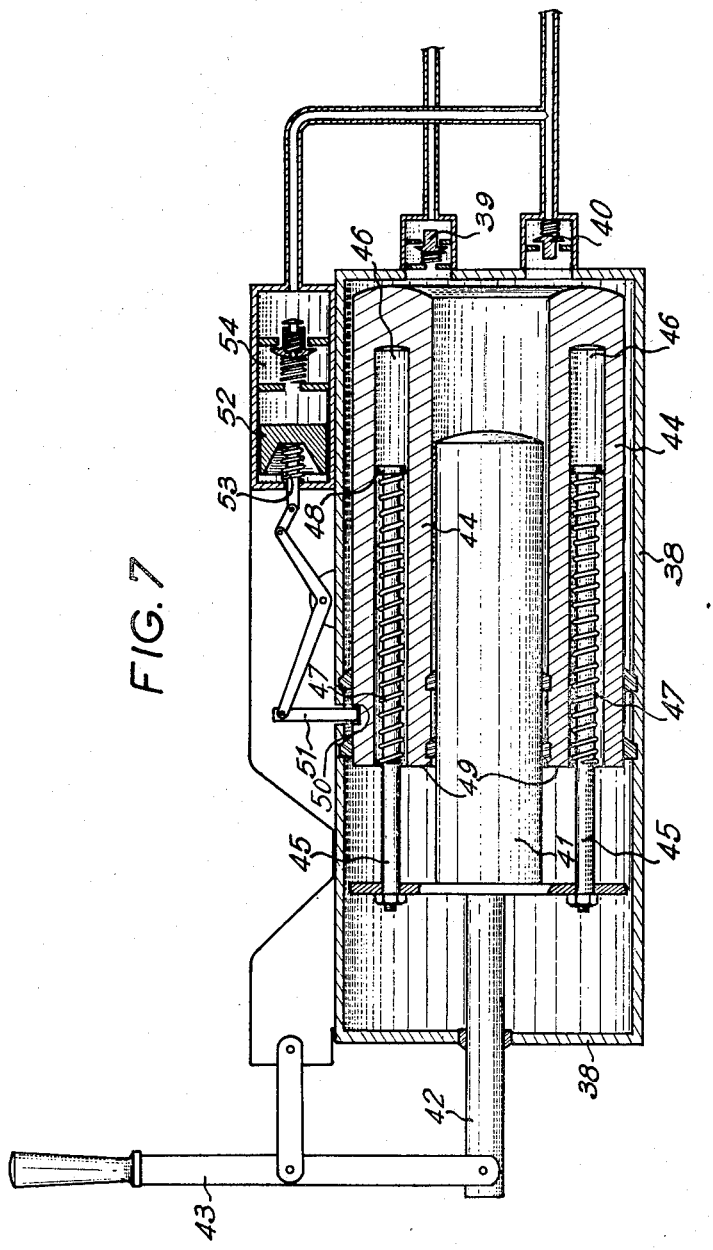
Fig. 7 is an axial view, partly in section and with parts broken away, of an hydraulic pump for use in the system of Fig. 6.

Fig. 7 illustrates in cross section a desirable construction for the pump 32. The pump body 38 is a steel casting and has associated with one of its ends an intake valve 39 and an outlet valve 40. An axially reciprocable piston 41 having a relatively small discharge volume is secured to a rod 42 reciprocable by a manual lever 43. The piston 41 is surrounded by a larger-delivery annular piston 44. A plurality of spaced rods 45 projecting into a groove 46 in piston 44 are rigidly supported from the main operating rod 42. Springs 47 acting between stops 48 on the rods 45 and shoulders defined at the opening of the annular groove 46 tend to urge the rods 45 into the groove. A notch 50 formed in a side of annular piston 44 is adapted to receive a latching pawl 51 projectable through an aperture in the pump body and operable through linkage from a control piston 52 slidable in an auxiliary cylinder secured outside the body. The piston 52 is biased rightwards by a spring 53 and is subjected on its opposite side to fluid pressure communicating with the pressure of the overhead hydraulic reservoir 33 by way of a dual valve 54.

The pump operates as follows. Should the pressure in the fluid circuit exceed a given value the piston 52 is forced leftward against its spring 53 and thus maintains latch 51 in engagement with the notch 50 in piston 44, blocking the outer piston. In this condition operation of hand lever 43 will reciprocate the inner piston 41 only and the pump operates at a low rate of delivery.

Should the discharge pressure drop to a lower value, the spring 53 forces the piston 52 to the right, releasing pawl 51. In these conditions the annular piston 44 is driven bodily with the inner piston on its suction stroke (leftward as shown), as the force of spring 47, now in compressed condition, exceeds the intake pressure of the fluid. On the inward or delivery stroke, the stop 48 is abutted against the end wall of groove 46 and causes the outer piston 44 to be driven rightward. The pump is then operated at maximum delivery.

Jack legs similar to those illustrated in Fig. 6 may be used with fluid power systems using compressed air rather than hydraulic fluid, and the controls for the system might be arranged, for example, in the cab of the carrier vehicle.

What I claim is:

A container for transporting merchandise comprising a box having housings in its walls extending vertically for the height thereof, a plurality of roller supports for said box each comprising a base flange beveled to engage with a dovetail slot and a castor pivoted thereto for adjustment about a vertical axis, an independent jack having a length substantially equal to the height of said box positioned in each of the housings in the walls of said box for moving each of said supports with respect to said box, the bottoms of said jacks being provided with dovetail slots for engagement with said base flanges, and the bottom of said box being provided at its periphery with dovetail slots for alternative engagement with said beveled base flanges, and operating mechanism for said jacks carried in the walls of said box and protected thereby.

References Cited in the file of this patent

UNITED STATES PATENTS

| Number | Name | Date |
|---|---|---|
| 750,612 | Crofut | Jan. 26, 1904 |
| 1,168,345 | Tamagno | Jan. 18, 1916 |
| 1,263,401 | Fraser | Apr. 23, 1918 |
| 1,322,948 | Rapson | Nov. 25, 1919 |
| 1,892,406 | Meyercord | Dec. 27, 1932 |
| 1,993,481 | Kellett | Mar. 5, 1935 |
| 2,002,455 | Schwerin | May 21, 1935 |
| 2,116,825 | Crescent | May 10, 1938 |
| 2,200,277 | Howie | May 14, 1940 |
| 2,388,380 | Bathurst | Nov. 6, 1945 |
| 2,430,872 | Grudin | Nov. 18, 1947 |
| 2,656,942 | Helms | Oct. 27, 1953 |
| 2,671,242 | Lewis | Mar. 9, 1954 |
| 2,751,234 | Couse | June 19, 1956 |
| 2,800,679 | Schultz | July 30, 1957 |